United States Patent [19]

Hagan

[11] Patent Number: 4,726,480
[45] Date of Patent: Feb. 23, 1988

[54] FAIL SAFE ULTRASONICALLY WELDED CONTAINER AND PROCESS

[75] Inventor: Richard J. Hagan, San Carlos, Calif.

[73] Assignee: McKesson Corporation, San Francisco, Calif.

[21] Appl. No.: 30,166

[22] Filed: Mar. 25, 1987

[51] Int. Cl.$^4$ .............................................. B65D 39/04
[52] U.S. Cl. ..................... 215/232; 156/69; 156/73.1; 215/311; 215/355; 215/307
[58] Field of Search ............... 215/232; 156/73.1, 69

[56] References Cited

U.S. PATENT DOCUMENTS

| | | | |
|---|---|---|---|
| 3,798,094 | 3/1974 | Costa | 156/69 |
| 3,920,503 | 11/1975 | Keeler | 215/232 X |
| 4,140,058 | 2/1979 | Ballreich et al. | 156/73.1 X |

Primary Examiner—Donald F. Norton
Attorney, Agent, or Firm—Flehr, Hohbach, Test, Albritton & Herbert

[57] ABSTRACT

A package (10) includes a polyethylene terephthalate (PET) container (12) having a necked opening (14). A PET insert (18) is fixedly attached to an inside surface (30) of the necked opening (14) by a plurality of tack welds (34). The tack welds (34) are formed within recesses (44) that extend completely through the wall of the necked opening (14) and into the insert (18). The insert (18) makes a substantially line contact (32) with the inside surface (30) of the necked opening (14). The substantially line contact (32) extends continuously around the inside surface (30) of the necked opening (14) to form a fluid tight seal between the inside surface (30) of the necked opening (14) and the insert (18). To make the package (10), the insert (18) is driven into the necked opening (14). The tack welds (34) are formed between the necked opening (14) and the insert (18) by application of ultrasonic energy at the necked opening (14) below the line contact (32), allowing tips (42) of ultrasonic transducers (36) to penetrate completely through the wall of the necked opening (14) and into the insert (18). The tack welds (34) fixedly attach the insert (18) to the necked opening (14). If the insert (18) and necked opening (14) structure is damaged, such as by dropping the package (10), failure occurs at the ultrasonic welds (34) allowing harmless venting of the pressure inside the package (10).

27 Claims, 5 Drawing Figures

U.S. Patent   Feb. 23, 1988   Sheet 1 of 2   4,726,480
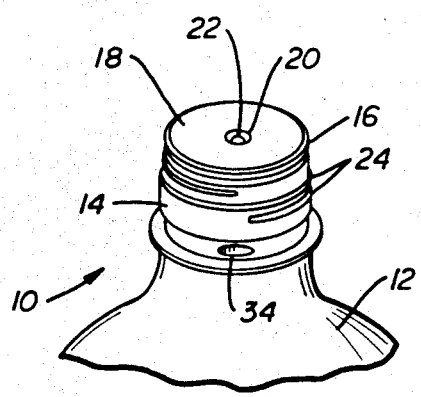
FIG._1.
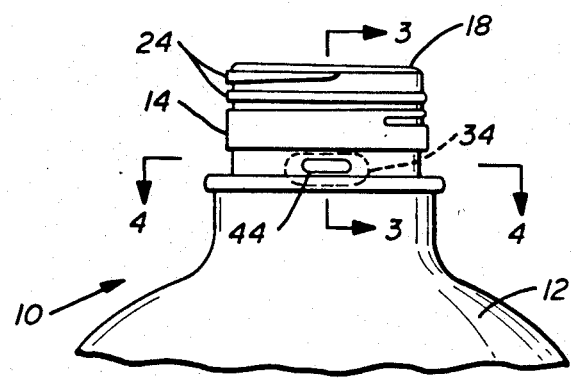
FIG._2.
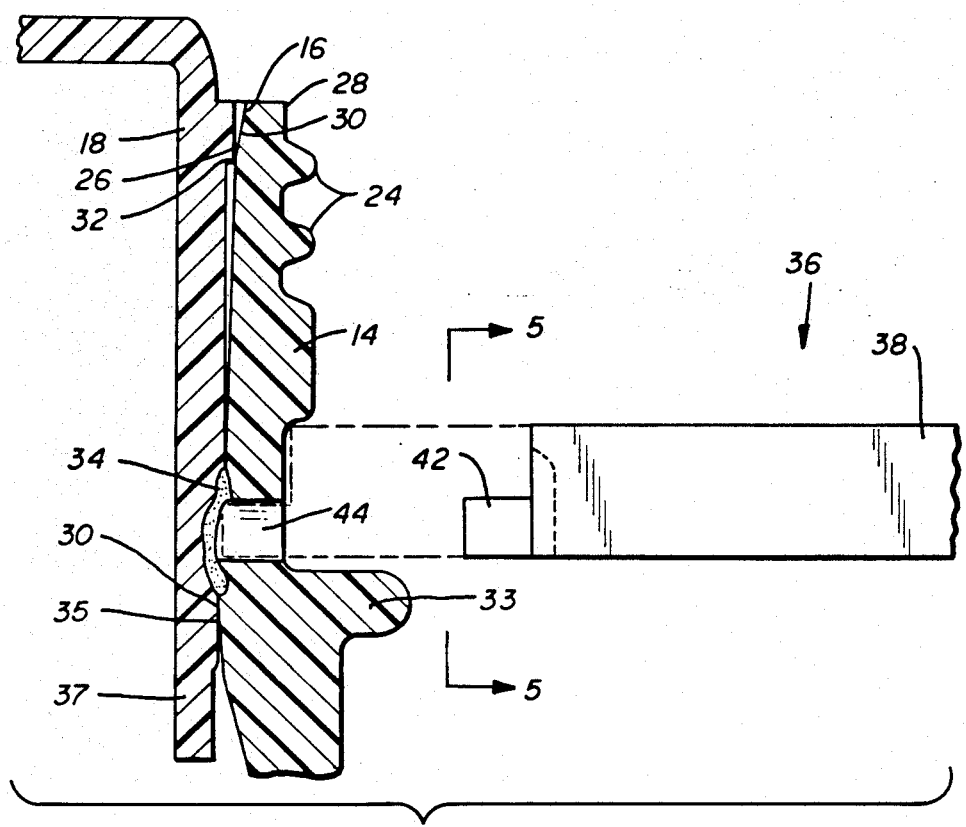
FIG._3.

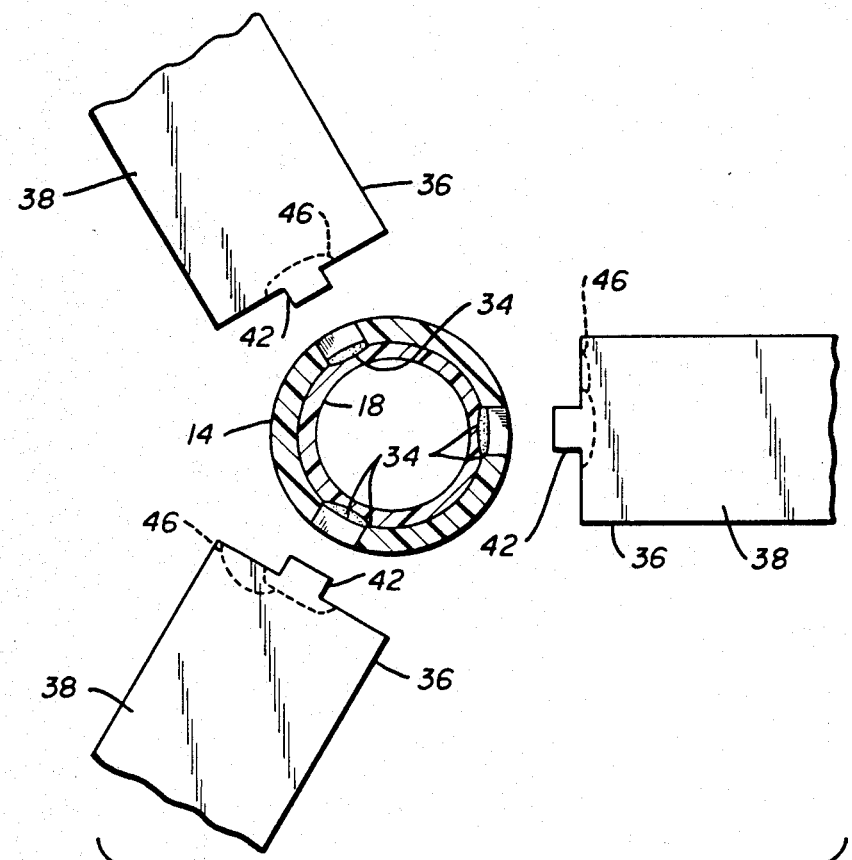
FIG._4.
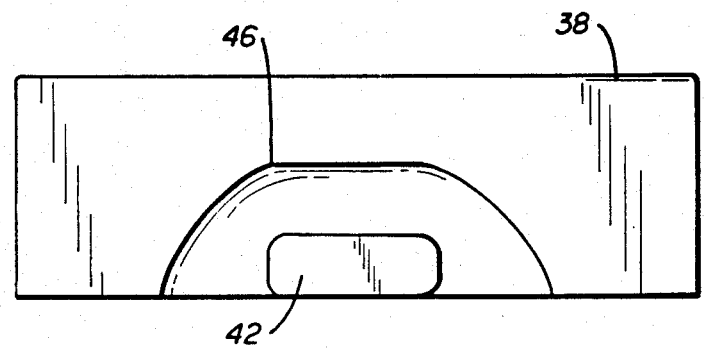
FIG._5.

4,726,480

FAIL SAFE ULTRASONICALLY WELDED CONTAINER AND PROCESS

CROSS REFERENCE TO RELATED APPLICATION

This application is directed to an improvement in an earlier filed application Ser. No. 06/893,041, filed Aug. 1, 1986 in the name of Richard J. Hagan and entitled "Ultrasonically Welded Container and Process.".

BACKGROUND OF THE INVENTION

1. Field of the Invention

This invention relates to an improved hermetically sealed container capable of withstanding elevated pressures which is capable of failing in a safe manner when damaged and to a process for making the container. More particularly, it relates to such a container and process which is especially adapted for use as an all plastic seltzer syphon package and for providing such an all plastic seltzer syphon package. Most especially, the invention relates to such a package incorporating an improved hermetic seal which will fail around the hermetic seal without resulting in flying projectiles when the package is damaged and to a process for making the hermetic seal.

2. Description of the Prior Art

The art relating to the ultrasonic bonding of thermoplastic resins is extensive. That art has been summarized in the above related application. In particular, Fesh, U.S. Pat. No. 3,563,822 described a tack welding process in which a tip of an ultrasonic transducer penetrates nearly through a first layer to be bonded to a second layer, through the first layer to an interface between the first layer and the second layer, or beyond the interface into the second layer while producing the tack welds, apparently producing equivalent results under these three conditions.

In the related application, a tack welding process is used to fix a valve insert into a necked opening of a thermoplastic resin container, with a hermetic line seal being formed between the inside surface of the necked opening and the insert as a result of the configuration of the insert and the cross sectional dimension of the necked opening. This tack welding process produces an improved package under high volume manufacturing conditions suitable for a mass produced packaged syphon carbonated beverage.

Such syphon packages must be capable of withstanding pressures of at least about 90 p.s.i., so that all of the carbonated beverage in the package can be dispensed before the pressure in the package drops enough due to increased head space so that it will no longer force remaining liquid through the syphon for dispensing. The provision of a plastic package for such syphon carbonated beverages represents a major safety advance when compared with the traditional thick glass bottles used to package syphon seltzer. This safety advance has the potential to restore the vestigal syphon seltzer industry. Even with the plastic package as described in the above related application, a potential unsafe failure mode remains. If such a package were to be dropped so that the insert in the necked opening strikes a hard surface, failure of the ultrasonic tack welds could allow the insert to be blown out of the necked opening by the high pressure inside the plastic bottle. Such a flying projectile could injure anyone near the container when this type of failure occurs. In fact, some aluminum twist off caps incorporate vent holes to relieve pressure in the event of a failure of the twist off cap which would otherwise send it flying, even at the lower pressures of about 30 p.s.i. employed with conventional packaged soft drinks.

SUMMARY OF THE INVENTION

Accordingly, it is an object of this invention to provide an improved hermetically sealed plastic package capable of withstanding elevated pressures which will fail in a safe manner when the region around the hermetic seal is damaged.

It is another object of the invention to provide such an improved package in which the fail safe hermetic seal is formed in part by ultrasonic welding.

It is a further object of the invention to provide such an improved package incorporating a fail safe PET to PET seal.

It is yet another object of the invention to provide a novel process for forming a PET to PET hermetic seal which will withstand elevated pressures, such as encountered in seltzer syphon packages, but which will safely vent the elevated pressures if damaged.

It is still another object of the invention to provide a novel simplified process for forming a fail safe hermetic seal between thermoplastic resin parts which will allow such seals to be made under high throughput manufacturing conditions.

The attainment of these and related objects may be achieved through use of the novel package and process herein disclosed. A package in accordance with this invention includes a thermoplastic, ultrasonically weldable resin, such as a PET, container having a necked opening. A thermoplastic, ultrasonically weldable resin insert is fixedly attached to an inside surface of the necked opening by a plurality of tack welds. The tack welds are each formed at a recess extending completely through a wall of the necked opening and into the resin insert. Each tack weld forms a hermetic seal around its recess between the necked opening and the insert. The insert makes at least one substantially line contact with the inside surface of the necked opening. The at least one substantially line contact extends continuously around the inside surface of the necked opening to form a fluid tight seal between the inside surface of the necked opening and the insert. In a preferred form of the package, the insert and the necked opening are configured so that a first substantially line contact is formed above the plurality of tack welds and a second substantially line contact is formed below the plurality of tack welds.

In the process for making the package in accordance with this invention, a thermoplastic, ultrasonically weldable resin container having a necked opening and a thermoplastic, ultrasonically weldable resin insert having a portion of greater cross sectional dimension than a remainder of the insert is provided. The portion of greater cross sectional dimension is sized to form an interference fit in the neck opening. The insert is driven into the necked opening. An ultrasonic transducer is penetrated completely through the necked opening and into the insert to form a plurality of recesses extending completely through a wall of the necked opening into the insert. A plurality of tack welds are formed ultrasonically between the necked opening and the insert around the plurality of recesses to form a hermetic seal around each of the recesses. The tack welds fixedly attach the insert to the necked opening below the portion of greater cross sectional dimension of the insert.

While essentially any thermoplastic, ultrasonically weldable resin may be employed in the package and process, they are especially suited for use with crystallizable thermoplastic, ultrasonically weldable resins. Such crystallizable resins, particularly PET, may undergo undesirably high levels of crystallization using conventional ultrasonic welding processes to make hermetic seals. Because the present invention prevents such undesirable cystallization from occurring, even in the case of PET, it is particularly advantageous for such resins. However, the process is simple and allows a very high throughput of containers in the formation of their hermetic seals. For these reasons, the invention is also useful for amorphous thermoplastic, ultrasonically weldable resins, even though such resins are not subject to undesirable crystallization with conventional ultrasonic bonded hermetic seals, such as an ultrasonically formed band seal between a container neck and an insert in the neck.

The combination of one or more line contact hermetic seals and the fail safe tack welds gives a package that will safely withstand pressures on the order of at least 90 p.s.i., which are conventional for seltzer syphon packages, and which will vent those pressures safely if the tack welds are damaged, such as by dropping the package. The process producing such a seal allows such packages to be made under high volume manufacturing conditions.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a perspective view of a portion of a package in accordance with the invention.

FIG. 2 is a side view of the package portion shown in FIG. 1.

FIG. 3 is a cross section view taken along the line 3—3 in FIG. 2.

FIG. 4 is a top sectional view taken along the line 4—4 in FIG. 2.

FIG. 5 is a front view of apparatus used to practice the process of the invention.

DETAILED DESCRIPTION OF THE INVENTION

Turning now to the drawings, more particularly to FIGS. 1-3, there is shown a package 10 in accordance with the invention. The package 10 includes a biaxially oriented PET bottle 12 having a neck 14 with an opening 16. A generally cylindrical insert 18 is attached to the necked opening 16 to form a hermetic seal. The insert 18 has a centrally disposed opening 20 sealed by a normally closed poppet valve 22. Neck 14 of the bottle 12 has a set 24 of threads on its outside surface for attaching a conventional aluminum closure cap (not shown) over the insert 18, as well as for attaching a syphon head (not shown) over the insert 18 after the aluminum closure cap has been removed. Further details on the nature of the package 10, including a complete description of the bottle 10, the insert 18 and the poppet valve 22 are provided in commonly assigned application Ser. No 008,628, filed Jan. 27, 1987 in the name of Richard J. Hagan et al., and entitled "Seltzer Package, Valve, Poppet and Spring," the disclosure of which is incorporated by reference herein.

To attach the insert 18 in the necked opening 16, the insert 18 is driven into the opening 16, as is best shown in FIG. 3. The insert 18 is dimensioned for an interference fit in the opening 16. In practice, the insert 18 has a portion 26 of increased diameter, which is about 0.025 inch greater than the inside diameter of the opening 16 to provide the interference fit. The interference fit is sufficient to hold the insert 18 in place in the opening 16. When the insert 18 is driven into the opening 16, the slightly larger diameter of the portion 26 than the inside diameter of the opening 16 forces the neck 14 to crown out slightly near its top 28, inclining the inside surface 30 of the neck 14. As a result of this incline, the portion 26 of increased diameter of the insert 18 makes a substantially line contact 32 extending around the inside surface 30 of the neck 14. The line contact 32 is about 0.075 inch below top 28 of the neck 14. This line contact 32 between the portion 26 and the surface 30 is with sufficient force that a hermetic seal is established that will withstand up to about 100 p.s.i. internal pressure in the bottle 12 prior to forming the ultrasonic welds before the insert 18 is blown from the opening 16. The inside diameter of the neck 14 is slightly reduced at reinforcing ring 33. A second line contact 35 is formed between the insert 18 and the inside surface 30 of the neck 14 opposite the ring 33. Portion 37 of the insert has its outside diameter reduced by about 0.025 inch so that the portion 37 can move past the inside surface 30 at the ring 33 without binding when the insert is driven into the neck 14.

For fixed attachment of the insert 18 in the neck 14, three ultrasonically formed tack welds 34 are established between the neck 14 and the insert 18 around the neck 14. The tack welds are formed below the threads 24 in order to avoid distorting the threads.

As shown in FIGS. 3 and 4, the tack welds 34 are formed at 120° spacings around the neck 14 and insert 18 by moving three ultrasonic transducers or horns 36 for application of the ultrasonic energy against the neck of the bottle. The ultrasonic transducers 36 have a body 38 and a projecting tip 42, which forms a recess 44 in the neck 14 of the bottle 12 during formation of the tack weld 34. The body 38 has a cut out 46 to accomodate any molten plastic ejected around the tip 42 when the tip 42 has penetrated completely through the neck 14 (see especially FIG. 3). An aluminum transducer or a titanium transducer having a gain of 6 to 1 has been found to be suitable for practicing the process. As shown in FIG. 3, the tack weld 34 is formed by melting a portion of both the insert 18 and the neck 14 to form a molecular bond between them. The tip 42 of the body 38 must penetrate completely through the neck 14 and slightly into the insert 18 to obtain the fail safe package of this invention. A penetration of about 0.025 inch into the insert 18 by the tip 42 is adequate for this purpose.

A weld time of from about one half to about one second is suitable, with a time of about 0.55 second being especially preferred. Shorter or longer weld times may be necessary for packages having a different configuration than that shown or for other thermoplastic resins.

In practice, an ultrasonic frequency of between about 30 to about 50 kilohertz and a somewhat lower amplitude than employed with conventional 20 kilohertz ultrasonic frequencies usually employed for ultrasonic welding of plastics is used. At these higher frequencies and lower amplitudes, sufficient heat for melting the PET to produce the tack weld is obtained without significant crystallization of the PET. By comparision, when sufficient ultrasonic energy is applied to form a continous band ultrasonic weld between the insert 18 and the neck 14, a hermetic seal cannot be obtained without producing a high level of crystallization of the PET at the insert 18 and neck 14, which weakens the PET sufficiently so that failure occurs. With high speed automated equipment for handling the bottles 12 and inserts 18, a throughput of 60 bottles per minute for each ultrasonic welding station can be achieved.

In a test of the invention, a PET seltzer package 10 was fabricated as described above, and filled with carbonated water at a pressure of about 90 p.s.i. The top of the insert 18 was hit with a hammer to simulate a drop induced failure of the hermetic seal between the insert 18 and the neck 14. The result was a breakage of the tack welds 34, allowing the pressure in the package 10 to vent harmlessly to the side of the neck 14, with the insert remaining in the neck of the bottle, even without a twist off cap on the neck 14 over the insert 18. For comparison, if a similar test is made with a package fabricated in the same manner except that the tip 42 of the ultrasonic transducer 36 is not allowed to penetrate completely through the neck 14, the result is unpredictable fracturing of the insert 18 or the neck 14, creating a potential for flying fragments as the pressure in the package 10 is released.

The package of this invention can be fabricated with a wide variety of other thermoplastic resins that can be ultrasonically welded in addition to PET. While the package and process is especially adapted for crystallizable thermoplastic resins, since it will avoid excess crystallization of such resins, the simplicity and speed of the process make it desirable for use with amorphous thermoplastic resins as well. Suitable specific examples of amorphous and crystallizable thermoplastic resins, in addition to PET, include PET copolymers, such as PET-glycol resins, other polyester resins, polycarbonates, nylons, acetyl-butyl-styrene (ABS) plastics, polypropylene, polystyrene, butadiene, polyphenylene oxide and sulfide, polyamide-imide copolymers, acrylic resins, polyvinyl chloride and the like.

It should now be readily apparent to those skilled in the art that a novel package and process for producing the package capable of achieving the stated objects of the invention has been provided. The package includes a simple and reliable hermetic seal incorporating at least one line contact in combination with a plurality of tack welds that is capable of withstanding the pressures of between about 90 p.s.i. and 125 p.s.i. encountered in seltzer syphon packages, yet which will fail in a safe manner when the hermetic seal is damaged, such as by dropping. The process allows fail safe packages incorporating the hermetic seal to be easily fabricated under high volume manufacturing conditions.

It should further be apparent to those skilled in the art that various changes in form and detail of the invention as shown and described may be made. It is intended that such changes be included within the spirit and scope of the claims appended hereto.

What is claimed is:

1. A package comprising a thermoplastic, ultrasonically weldable resin container having a necked opening and a thermoplastic, ultrasonically weldable resin insert fixedly attached to an inside surface of said necked opening by a plurality of tack welds, each of said plurality of tack welds being formed at a recess extending completely through a wall of said necked opening and into said resin insert, each tack weld forming a hermetic seal around its recess between said necked opening and said insert, said insert making at least one substantially line contact with the inside surface of said necked opening, said at least one substantially line contact extending continuously around the inside surface of said necked opening to form at least one fluid tight seal between the inside surface of said necked opening and said insert.

2. The package of claim 1 in which said resin insert is fixedly attached to the inside surface of said necked opening by at least three tack welds.

3. The package of claim 1 in which said necked opening has an external surface having a set of threads and said plurality of tack welds are below said set of threads.

4. The package of claim 1 in which said insert and said necked opening are configured so that one of said at least one substantially line contact is formed above said plurality of tack welds and another of said at least one substantially line contact is formed below said plurality of tack welds.

5. The package of claim 1 in which said insert and said necked opening are configured by said insert having a portion of greater cross sectional dimension than a remainder of said insert near a top of said insert and said necked opening, said portion of greater cross sectional dimension engaging the inside surface of said necked opening near the top of said necked opening in an interference fit to form a first one of said at least one substantially line contact, said necked opening inclining outward at the engagement of said portion of greater cross sectional dimension and the inside surface of said necked opening.

6. The package of claim 5 in which said necked opening has a portion of reduced cross sectional dimension below said plurality of tack welds, said insert engaging the inside surface of said necked opening to form a second one of said at least one line contact at the portion of reduced cross sectional dimension.

7. The package of claim 1 in which said insert has a fluid flow path through said necked opening and a normally closed valve in said fluid flow path.

8. The package of claim 1 in which said thermoplastic, ultrasonically weldable resin container and insert are a crystallizable resin container and insert.

9. The package of claim 8 in which the crystallizable resin is polyethylene terephthalate.

10. A process for making a package, which comprises providing a thermoplastic, ultrasonically weldable resin container having a necked opening and a thermoplastic, ultrasonically weldable resin insert having a portion of greater cross sectional dimension than a remainder of the insert, the portion of greater cross sectional dimension being sized to form an interference fit in the necked opening, driving the insert into the necked opening, penetrating completely through the necked opening and into the insert with an ultrasonic transducer to form a plurality of recesses extending completely through a wall of the necked opening into the insert, and forming a plurality of tack welds between the necked opening and the insert around the plurality of recesses to form a hermetic seal around each of the recesses, fixedly to attach the insert to the necked opening, by application of ultrasonic energy at the necked opening below the portion of greater cross sectional dimension of the insert.

11. The process of claim 10 in which the ultrasonic energy is applied by contacting the necked opening of the container simultaneously with a plurality of ultrasonic transducers having projecting tips dimensioned to extend completely through a wall of the necked opening and into the insert.

12. The process of claim 10 in which the ultrasonic energy has a frequency of between about 30 kilohertz and about 50 kilohertz.

13. The process of claim 10 in which the thermoplastic, ultrasonically weldable resin container and insert are a crystallizable resin container and insert.

14. The process of claim 13 in which the crystallizable resin is polyethylene terephthalate.

15. The process of claim 10 in which the necked opening has an outside surface having a set of threads and the tack welds are formed below the set of threads.

16. The process of claim 10 in which the interference fit is formed above the plurality of tack welds and the insert and the necked opening are configured so that another interference fit is formed below the plurality of tack welds.

17. The process of claim 16 in which the necked opening has a portion of reduced cross sectional dimension below the plurality of tack welds, and the insert engages the inside surface of the necked opening to form the other interference fit at the portion of reduced cross sectional dimension.

18. The process of claim 10 in which at least three tack welds are formed.

19. A process for making a package, which comprises providing a thermoplastic, ultrasonically weldable resin container having a necked opening and a thermoplastic, ultrasonically weldable resin insert, the insert being sized to form an interference fit in the necked opening, driving the insert into the necked opening to establish a substantially line contact extending around an inside surface of the necked opening to form a hermetic seal between the inside surface of the necked opening and the insert, penetrating completely through the necked opening and into the insert with an ultrasonic transducer to form a plurality of recesses extending completely through a wall of the necked opening into the insert, and forming a plurality of tack welds between the necked opening and the insert around the plurality of recesses to form a hermetic seal around each of the recesses, fixedly to attach the insert to the necked opening, by application of ultrasonic energy at the necked opening below the substantially line contact.

20. The process of claim 19 in which the ultrasonic energy is applied by contacting the necked opening of the container simultaneously with a plurality of ultrasonic transducers having projecting tips dimensioned to extend completely through a wall of the necked opening and into the insert.

21. The process of claim 19 in which the ultrasonic energy has a frequency of between about 30 kilohertz and about 50 kilohertz.

22. The process of claim 19 in which the thermoplastic, ultrasonically weldable resin container and insert are a crystallizable resin container and insert.

23. The process of claim 22 in which the crystallizable resin is polyethylene terephthalate.

24. The process of claim 19 in which the necked opening has an outside surface having a set of threads and the tack welds are formed below the set of threads.

25. The process of claim 19 in which the interference fit is formed above the plurality of tack welds and the insert and the necked opening are configured so that another interference fit is formed below the plurality of tack welds.

26. The process of claim 25 in which the necked opening has a portion of reduced cross sectional dimension below the plurality of tack welds, and the insert engages the inside surface of the necked opening to form the other interference fit at the portion of reduced cross sectional dimension.

27. The process of claim 19 in which at least three tack welds are formed.

* * * * *